United States Patent [19]
Transue et al.

[11] Patent Number: 5,893,902
[45] Date of Patent: Apr. 13, 1999

[54] VOICE RECOGNITION BILL PAYMENT SYSTEM WITH SPEAKER VERIFICATION AND CONFIRMATION

[75] Inventors: Patrick A. Transue, Springfield; Ronald J. Jonaitis, Reston, both of Va.

[73] Assignee: Intelidata Technologies Corp., Herndon, Va.

[21] Appl. No.: 08/599,557

[22] Filed: Feb. 15, 1996

[51] Int. Cl.$^6$ ............................................. G10L 3/00
[52] U.S. Cl. .......................... 704/275; 704/270; 704/273
[58] Field of Search .......................... 395/2.1, 2.79, 395/2.81, 2.84; 379/55; 704/201, 270, 272, 275, 231, 273, 250

[56] References Cited

U.S. PATENT DOCUMENTS

| | | | |
|---|---|---|---|
| 4,780,906 | 10/1988 | Rajasekaran et al. | 381/43 |
| 4,797,911 | 1/1989 | Szlam et al. | 379/67 |
| 4,831,551 | 5/1989 | Schalk et al. | 364/513.5 |
| 4,852,171 | 7/1989 | Jakatdar et al. | 381/43 |
| 4,866,778 | 9/1989 | Baker | 381/43 |
| 4,989,248 | 1/1991 | Schalk et al. | 381/42 |
| 5,091,947 | 2/1992 | Ariyoshi et al. | 381/42 |
| 5,131,027 | 7/1992 | Hird et al. | 379/112 |
| 5,146,491 | 9/1992 | Silver et al. | 379/114 |
| 5,241,649 | 8/1993 | Niyada | 395/2 |
| 5,301,227 | 4/1994 | Kamei et al. | 379/88 |
| 5,335,313 | 8/1994 | Douglas | 395/2.84 |
| 5,365,574 | 11/1994 | Hunt et al. | 379/88 |
| 5,438,615 | 8/1995 | Moen | 379/144 |
| 5,473,143 | 12/1995 | Vak et al. | 235/380 |
| 5,583,933 | 12/1996 | Mark | 379/55 |

OTHER PUBLICATIONS

Essinger, "Natwest launches telephone banking pilot scheme," Electronic Banking & Finance, vol. 5, No. 6, pp. 13–15, Aug. 1988.

InterVoice, RobotOperator System Product Description Manual (InterVoice, Inc., Dallas, TX) Jun. 15, 1994.

*Primary Examiner*—David R. Hudspeth
*Assistant Examiner*—Harold Zintel
*Attorney, Agent, or Firm*—Darby & Darby

[57] ABSTRACT

A flexible, easily used bill payment system which utilizes voice recognition and playback technology to allow each user to establish and maintain an audible list of biller names. Each user is able to create a personalized list of billers by merely speaking and recording the name of the biller. Each spoken biller name for each user is recorded within the system. Each spoken biller name for each user is recorded by the system and used as confirmation prompts in a bill paying session by that particular user. In this way, the system of the present invention allows each user to dynamically maintain a customized list of biller names recorded in the user's own voice. The recording of biller names is carried out as part of a initialization or setup procedure. To use the system, the user or billee dials the bill payment systems and selects bill payment mode. With the system in bill payment mode, the user selects whether a one-time or recurring bill is to be paid. For either type of bill, the user indicates both the merchant and the amount of the bill to be paid. In the case of a one-time bill, the user specifies the date on which the bill is to be paid. Conversely, in the case of a recurring bill, the user specifies a start date and an end date, specifying the period in which multiple bills are to be paid to the particular merchant. The bill payment system of the present invention also includes capabilities for reviewing, changing or cancelling payments, as well as modifying and updating the user's custom list of merchants.

4 Claims, 7 Drawing Sheets

MAIN MENU

| | |
|---|---|
| "TO MAKE A PAYMENT" | "PRESS 1" OR SAY |
| "TO REVIEW, CHANGE OR CANCEL A PAYMENT" | "PRESS 2" OR SAY |
| "FOR MERCHANT LISTING, ADDITIONS OR CHANGES | "PRESS 3" OR SAY |
| "FOR A DESCRIPTION OF BILL PAYMENT SERVICES" | "PRESS 4" OR SAY |
| "TO SPEAK WITH A CUSTOMER SERVICE REPRESENTATIVE" | "PRESS O" OR SAY |
| "TO CHANGE YOUR BILL PAYMENT PASSWORD" | "PRESS 5" OR SAY |

*Fig. 1*

MERCHANT MAINTENANCE

| | |
|---|---|
| "TO HEAR YOUR RECORDED MERCHANT LIST" | "PRESS 1" OR SAY |
| "TO ADD A MERCHANT" | "PRESS 2" OR SAY |
| "FOR DELETE MERCHANT" | "PRESS 3" OR SAY |
| "TO CHANGE OR DELETE A MERCHANT NAME | "PRESS 4" OR SAY |
| "TO SPEAK WITH A CUSTOMER SERVICE REPRESENTATIVE" | "PRESS O" OR SAY |

*Fig. 2*

VOICE RECOGNITION BILL PAYMENT SYSTEM WITH SPEAKER VERIFICATION AND CONFIRMATION

FIELD OF THE INVENTION

The present invention generally relates to bill payment systems. More specifically, the present invention relates to voice-based electronic bill payment systems which include voice recognition capabilities for use in processing bill payment transactions.

BACKGROUND OF THE INVENTION

The simplest form of bill payment and processing involves the generation of a paper bill indicating the necessary information required to accomplish the bill payment transaction. The term "bill" will be understood to include periodic, such as monthly, bills, and non-recurring bills, such as invoices. The paper bill typically identifies the biller. The term "biller" is used to identify a party, such as a merchant or utility or service provider, who has performed services or provided goods and is seeking appropriate compensation therefor. The "biller" is also referred to as the "payee" since it is the recipient of the funds transferred during the bill payment process. The paper bill also identifies the "billee" or "payor", i.e., the party to whom the bill is directed and from whom payment is expected. The bill also customarily includes one or more additional items of information, such as the amount of the bill; payment terms; due date; finance charges and penalties; and itemized charges reflected in the billed amount. Of course, other information may be provided as well.

To effect payment of a paper bill, the billee customarily returns the bill (or a portion thereof) to the biller, using mail delivery or the like, along with payment in the form of a check or money order, or credit or debit card authorization. The payment is then received by the biller and processed. In the case of payment by check, bill processing includes handling the paper bills and checks received; depositing the checks in the biller's bank account; keeping track of whether each check is accepted (cleared) or rejected by the biller's bank; and crediting the biller's account in the amount of the cleared check. While payment by money order or debit or credit card is somewhat less complex, problems nonetheless exist.

The above-described paper-based bill payment system suffers from several disadvantages. First, the preparation and mailing of paper bills by the biller is expensive and time consuming. Second, there is oftentimes a significant delay before the bill is received by the billee. In fact, it is not uncommon for the bill to be lost altogether in the postal system and never received by the billee. This situation is extremely deleterious and frustrating for both biller and billee. For the billee, eventual payment is delayed until the situation is discovered and properly addressed. For the biller, it may lead to the unnecessary imposition of late fees, finance charges and a negative credit history, with the biller being under the mistaken impression that the billee is purposefully being delinquent in paying the bill.

A third disadvantage inherent in a paper-based bill paying system is that a significant amount of time, effort and expense must be expended by the billee in making bill payments. The paper bills must be organized, and checks must be written and mailed back to the biller. Additionally, proper postage must be affixed to the return payment. A fourth disadvantage of this system is the complicated processing of payments by the biller. Receiving payments, depositing checks and crediting billee accounts is often a time consuming and needless expenditure of resources. However, all of these disadvantages are unavoidable due to the practical limitations of a paper-based billing system. Even the use of written credit or debit card authorizations only partially address these problems.

One alternative to paper-based bill payment is the use of preauthorized automatic bank withdrawals. In this type of system, a billee notifies his bank, identifies particular billers and authorizes the automatic withdrawal of funds in amount equal to each bill submitted by that particular biller. Although this system is somewhat simpler from the point of view of the billee, it nevertheless has significant drawbacks. Among these drawbacks are the fact that the identification of billers and authorization of automatic withdrawal is typically accomplished by completing a paper form for each biller. Additionally, the system is limited to those participating billers which have an established relationship with the automatic withdrawal banking system. Moreover, in this system, the billee is usually not aware of the bill amount until the automatic withdrawal of the bill amount has been completed.

Yet another alternative bill paying system allows billees to pay bills using a telephone. In this type of system, each biller and billee is identified by way of a unique biller identification number. To pay a bill, a billee calls a bill transaction center or clearinghouse and enters his billee identification number. After the appropriate initialization and verification procedures are performed, the billee uses the telephone touchtone numeric keypad to enter the biller identification number corresponding to the particular bill to be paid. Again using the touchtone keypad, the billee enters the amount of the bill to be paid, with the last two digits determining cents amount and the remaining digits determining the dollars amount. A special key, such as the "*" or "#" key, is then used to confirm the amount and authorize payment of the bill.

Again, this telephone-based bill payment system suffers from several disadvantages. First, the system is limited to the payment of bills issued by those billers which are preregistered with the billing system.- Second, the system is cumbersome from the user's point of view in that billees are required to maintain and have at their ready disposal a list of billers and associated identification numbers. Otherwise, the particular biller cannot be identified and the bill payment cannot be carried out.

In order to overcome some of the deficiencies inherent in the above-described bill payment systems, more recent bill payment systems have been developed which utilize voice recognition technology. In one such system, the billee speaks the name of the particular biller whose bill it is desired to pay. The billee's speech is captured and analyzed to determine the intended biller. In this way, the billee is no longer required to maintain a biller identification code in order to perform bill payment. Although the user interface in this type of system is improved, the remainder of the system in inflexible in that the universe of permitted billers is still limited to those who have registered with the system. Typically, these systems allow for bill payment only to major national billers. If the system is configured and initialized differently for each geographic region, then the dominant, local billers in each geographic region may be included in addition to the national billers.

OBJECTS OF THE INVENTION

It is an object of the present invention to provide a user-friendly bill payment system which utilizes voice recognition technology.

It is an additional object of the present invention to provide a bill payment system which allows each user to establish and maintain a personalized list of billers.

It is a further object of the present invention to provide a bill payment system which allows a user to select a biller by speaking the biller's name, and using voice recognition technology, comparing the spoken biller name to previously recorded biller names recorded by the user.

It is yet an additional object of the present invention to provide a voice recognition and playback bill payment system which provides audible confirmation of a biller selected by speaking the biller's name, by playing back to the user the name of the biller previously recorded by the user in the user's voice.

SUMMARY OF THE INVENTION

The present invention is a flexible, easily used bill payment system which utilizes voice recognition and playback technology to allow each user to establish and maintain an audible list of biller names. Each user is able to create a personalized list of billers by merely speaking and recording the name of the biller. Each spoken biller name for each user is recorded by the system and used as confirmation prompts in a bill paying session by that particular user. In this way, the system of the present invention allows each user to dynamically maintain a customized list of biller names recorded in the user's own voice. The recording of biller names is carried out as part of an initialization or setup procedure for each user. To use the system, the user or billee dials the bill payment system and selects a "bill payment" mode. With the system in such bill payment mode, the user selects whether a one-time or recurring bill is to be paid. For either type of bill, the user indicates both the merchant and the amount of the bill to be paid. In the case of a one-time bill, the user specifies the date on which the bill is to be paid. Conversely, in the case of a recurring bill, the user specifies a start date and an end date, specifying the period in which multiple bills are to be paid to the particular merchant. The bill payment system of the present invention also includes capabilities for reviewing, changing or cancelling payments, as well as modifying and updating the user's custom list of merchants.

BRIEF DESCRIPTION OF THE DRAWINGS

Other objects, features and advantages of the invention discussed in the above brief explanation will be more clearly understood when taken together with the following detailed description of an embodiment which will be understood as being illustrative only, and the accompanying drawings reflecting aspects of that embodiment, in which:

FIG. 1 is a listing of a main menu of operations of the system of the present invention;

FIG. 2 is a listing of a merchant maintenance menu of the system of the present invention;

DETAILED DESCRIPTION OF THE PREFERRED EMBODIMENTS

Referring now to FIG. 1, therein is illustrated a graphical representation of the main menu audio prompts which are presented to a user of a preferred embodiment of the present bill payment system. When a user of the present invention dials up the system using a telephone, he is presented with an audio menu of the various selections which may be made. For each selection, the user is instructed to press an appropriate number on the telephone keypad or, alternatively, to speak a corresponding number. The selections found in the main menu include: making a payment; reviewing, changing or cancelling a payment; merchant listings, additions or changes; description of bill payment services; option to speak with a customer service representative; and option to change the bill payment password. Depending on the user input at the main menu stage, the program flow of the present invention branches off to a particular subroutine to implement the specific feature selected by the user. The specific feature selected by the user may result in the user being presented with an additional menu of options from which to select or, alternatively, may carry the user through a series of questions and responses in order to carry out the specific function selected by the user.

For example, if the user at the main menu stage of FIG. 1 selects the option for "merchant listings, additions or changes," the user is then presented with the merchant maintenance audio menu illustrated in FIG. 2. The merchant maintenance audio menu of FIG. 2 presents the user with several options, including: listening to the user's recorded merchant list; adding a merchant; deleting a merchant; changing or deleting a merchant name; and the option of speaking with customer service representative. The options illustrated in FIG. 1 are representative of typical options commonly found in bill paying systems, and are intended as illustrative examples and are not exhaustive of the complete list of available options that may be presented to a user. It is contemplated that additional or different options may be presented to the user depending on the configuration of the particular system. For example, an option may be to select the particular language in which to conduct the user's transaction. To select a particular option, the user is instructed to press a corresponding number or speak the corresponding number.

Figure 3A:
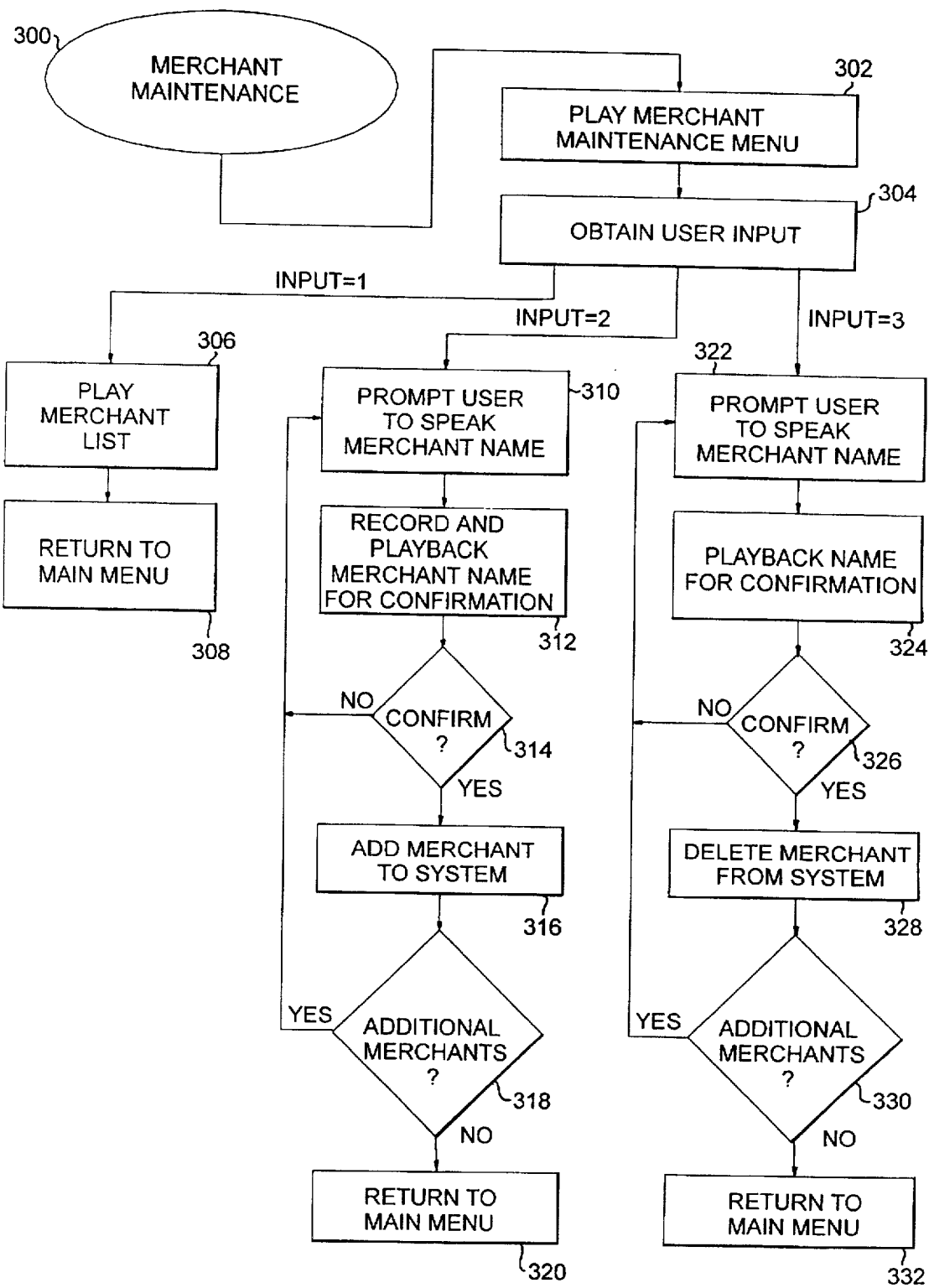
FIGS. 3A and 3B are flow charts illustrating the program sequence of the merchant maintenance portion of the present invention.
Figure 3B:
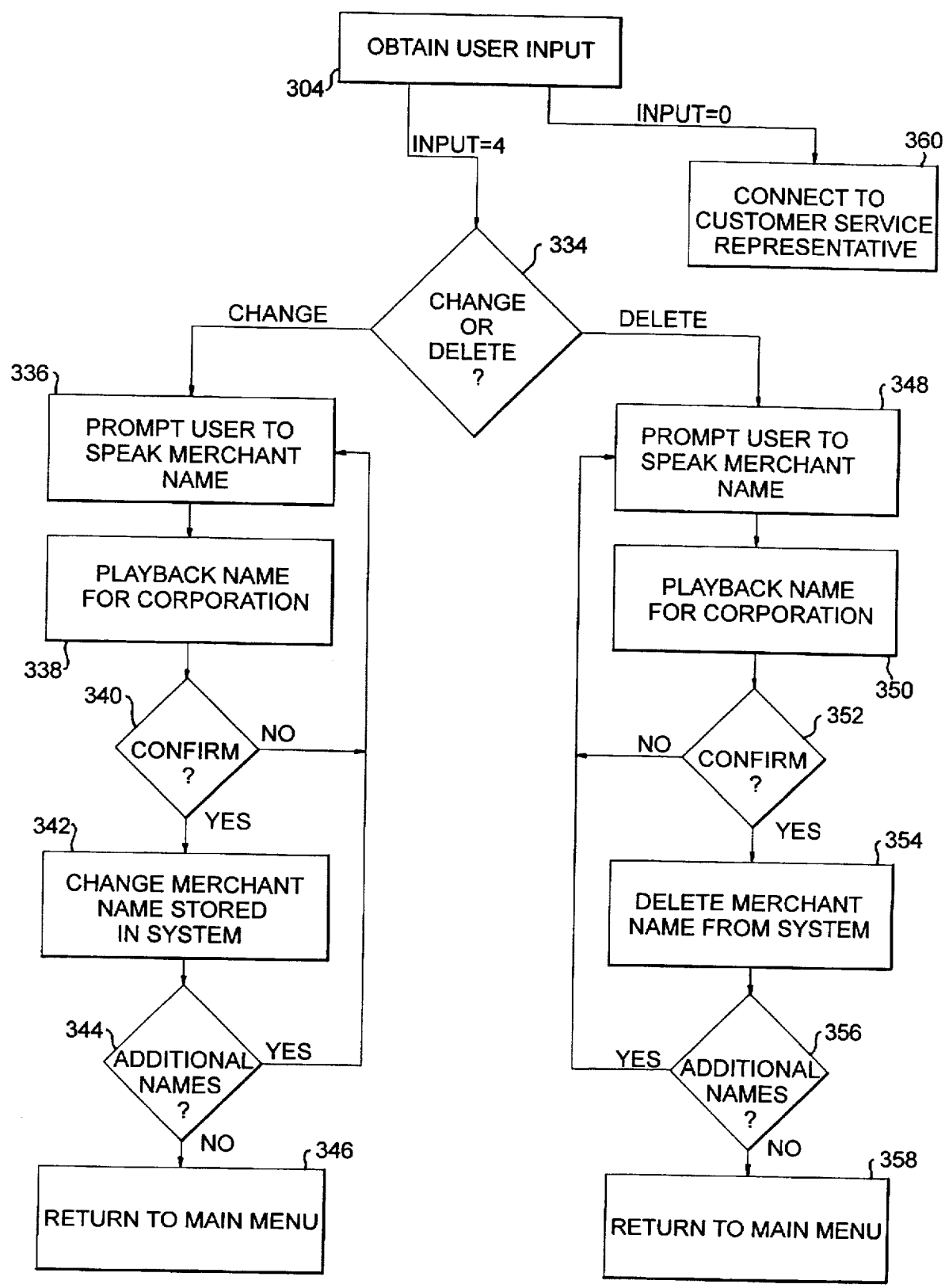

The program flow associated with implementing the various options presented to the user within the merchant maintenance audio menu are illustrated in the flow chart of FIGS. 3A and 3B. Referring now to FIG. 3A, system operation is at step 300 when the user selects the merchant maintenance audio menu (merchant listings, additions or changes) from the main menu of FIG. 1. Program operation proceeds to step 302 where the merchant maintenance audio menu of FIG. 2 is played for the user. At step 304, the system obtains the user's input, i.e., which function has been selected. If the user input corresponds to selection "1", i.e., playback of the recorded merchant list, program operation proceeds to step 306 where the user's prerecorded list of merchants is played back for the user to hear. Once the list of merchants has been played for the user, system operation proceeds to step 308 and returns to the main menu of FIG. 1.

If at step 304 the user input selection is item "2", i.e., the addition of a merchant, system operation proceeds to step 310 where the user is prompted to speak a merchant name. As the user speaks the merchant name, the system records the user's spoken voice and plays back the recorded merchant name, in the user's voice, for confirmation to the user at step 312. At step 314, the user is queried to confirm whether the played back name is correct or not. If the user does not confirm the played back name, program control returns to step 310 and prompts the user again to speak the merchant name. If instead at step 314, the user affirmatively confirmed the played back merchant name, system operation proceeds to step 316 where the merchant spoken at step 310 is added to the user's customized list of merchants recorded and maintained within the system. The system then proceeds to step 318 where the user is queried as to whether additional merchants are to be added into the user's customized list. If at step 318 the user indicates that additional merchants are to be added, system operation loops back to step 310 and the process is repeated again in order to record the name of the additional merchant to be added to the user's customized list of merchants. If instead at step 318 the user indicated that no merchants are to be added, the system proceeds to step 320 and returns to the main menu of FIG. 1.

Returning now to step 304 of FIG. 3A, if the user input indicates that item "3" has been selected, i.e., deletion of a merchant, system operation proceeds to step 322 where the user is prompted to speak the merchant name which is to be deleted. At step 324 the particular merchant's name is played back to the user for confirmation. Next, at step 326 the user is queried in order to confirm whether the played back name is the name to be deleted. If at step 326 the user does not confirm the particular merchant name, system operation loops back to step 322 and again prompts the user to speak a merchant name. If instead at step 326 the user confirmed the played back merchant is to be deleted from the system, then system control proceeds to step 328 where the merchant identified in step 322 is deleted from the system. The system then proceeds to step 330 where the user is queried as to whether additional merchants are to be deleted from the system. If at step 330 the user indicates that additional merchants are to be deleted, then system operation loops back to step 322 and the process is again repeated. If instead at step 330, the user indicates that no additional merchants are to be deleted, system operation proceeds to step 332 and returns to the main menu of FIG. 1.

Referring now to FIG. 3B, if at step 304 the user input is item "4", i.e., changing or deleting a merchant name, then system operation proceeds to step 334. At step 334 the user is queried as to whether it is desired to change or delete a merchant name. If at step 334 the user indicates that it is desired to change a merchant name, then the system proceeds to step 336 where the user is prompted to speak the merchant name. As the user speaks the merchant name, it is recorded and played back for confirmation at step 338, then proceeds to step 340 where the user is queried in order to confirm whether the played back merchant name is acceptable or not. If the played back merchant name is not acceptable, the system loops back to step 336 and again prompts to speak the merchant name. If instead at step 340 the user indicates that the played back merchant name is acceptable, the system proceeds to step 342 and changes the merchant name previously stored in the system to the one just spoken by the user. The system then proceeds to step 344 and queries the user as to whether additional names are to be changed or not. If at step 344 the user indicates that additional names are to be changed, system operation loops back to step 336 and again repeats the process. Alternatively, if at step 344 the user indicates that no additional names are to be changed, system operation proceeds to step 346 and returns to the main menu of FIG. 1.

Going back to step 334 of FIG. 3B, if the user indicates that a merchant name is to be deleted, then system operation proceeds to step 348 where the user is prompted to speak the merchant name which is to be deleted. The system then proceeds to step 350 where the merchant name spoken by the user is played back for confirmation. The user is then queried at step 352 in order to confirm whether the played back name is to be deleted. If the user does not confirm the deletion of the played back name at step 352, system operation loops back to step 348 and the user is prompted to speak the merchant name again. Alternatively, if at step 352 the user confirms that the playback name is in fact to be deleted, then system operation proceeds to step 354 where the merchant name played back at step 350 is deleted from the system. The operation of the system then proceeds to step 356 where the user is queried as to additional names are to be deleted. If the user indicates at step 356 that additional names are to be deleted, then system operation loops back to step 348 and the process is again repeated. Alternatively, if at step 356 the user indicates that no additional names are to be deleted, then system operation proceeds to step 358 and returns to the main menu of FIG. 1.

If at step 304 of FIG. 3B, the user input indicates that item "0" has been selected, then system operation proceeds to step 360 where the user is connected to a customer service representative for real-time communication and interaction with a human operator.

Figure 6:
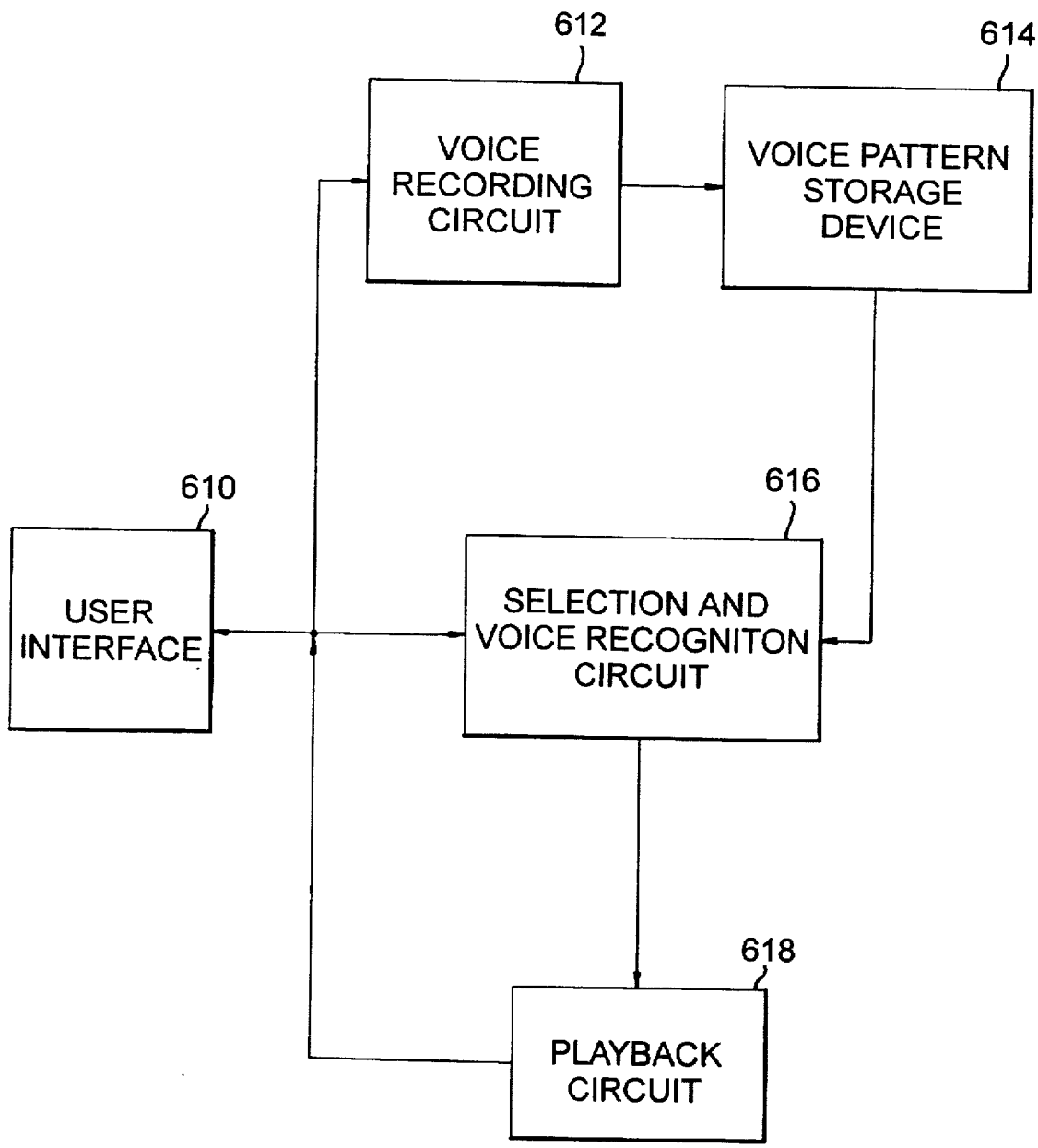
FIG. 6 is a block diagram of a bill payment system according to the present invention.

FIG. 6 is an illustration of a bill payment system 600 according to the present invention. The system 600 includes a user interface 610 for receiving user inputs, such as a user's voice patterns, and for providing bill payment information to the user. A voice recording circuit 612 stores voice patterns input by the user in a suitable voice pattern storage device 614. The system further includes a selection and voice recognition circuit 616 which performs voice recognition on a user's current voice pattern input through the interface 610 and selects a stored voice pattern in the voice pattern storage device 614 which matches the current voice pattern. A playback circuit 618 is also provided to play back to the user bill payment information which includes the selected stored voice pattern that matches the current voice pattern.

The present invention may be implemented using generally available computer components and speech dependent voice recognition hardware and software modules. One embodiment of the present invention is implemented using a personal computer, 32 megabytes of RAM, two 1 gigabyte hard drives, an X.25 interface card, a dual T1 interface card, an InterVoice Resource Card II (Part No. 25.02.02) and an InterVoice Voicedial, North American (8 port) Dependent software module (Part No. 24.20.01). The InterVoice hardware and software modules are available from InterVoice, Inc. of Dallas, Tex. Similar voice response and processing systems which provide interactive voice response may also be used. Voice synthesis is used extensively in the present system. For example, the various audio menus presented to the user are presented as a synthesized voice. Alternatively, the voice prompts and audio menus may be pre-recorded using a human operator. Similarly, voice recognition is also extensively used in the present system. The various responses which are spoken by the user are interpreted by the system using voice recognition technology. For example, when a user is prompted to answer "Yes" or "No", the user merely speaks one of the two words and the system, using the voice recognition technology, determines which word has been spoken by the user in order to proceed as directed by the user. Voice recognition is also used to determine which merchant names have been spoken by the user.

Voice recognition is a well-known technology for identifying an unknown input voice pattern by comparing it with a stored reference pattern and calculating a degree of similarity therebetween. Voice recognition may be classified into two types, i.e., speaker-independent recognition and speaker-dependent recognition. The conventional speaker-independent recognition uses a dictionary designed exclusively for storing reference patterns of spoken words for the speaker-independent recognition. Likewise, the conventional speaker-dependent recognition uses a dictionary designed exclusively for storing reference patterns of words for the speaker-dependent recognition. A reference pattern for the speaker-independent recognition is produced on the basis of voices uttered by a plurality of speakers in order to eliminate a specific pattern depending on an individual. A reference pattern for the speaker-dependent recognition is produced for each individual, and therefore contains a specific pattern inherent in an individual. Therefore, a reference voice pattern of a word for the speaker-independent recognition is different from a reference voice pattern of the same word for the speaker-dependent recognition. That is, both the speaker-independent and speaker-dependent reference patterns for one spoken word are not equivalent to each other. It is to be noted that it is very difficult to produce a dictionary used in common for the speaker-independent and speaker-dependent recognition processes in the current stage of the voice recognition technology.

The four basic steps involved in the recognition of speech are: feature extraction, time registration, pattern similarity measurement, and decision strategy. An additional task which is required prior to speaker-dependent recognition is referred to as enrollment. This is the process by which speaker-dependent reference patterns are formed for subsequent use during the recognition process. Current speech recognition systems use a variety of techniques to perform these basis steps. Each approach has its own performance and cost mix.

The basic speech recognition strategy is to "scan" the incoming speech data continuously, perform dynamic programming, compute a similarity measure or "distance" between the utterance spoken and the stored reference patterns, and decide if the similarity measure is sufficiently small to declare that the utterance is recognized. The major algorithm steps which are implemented are: autocorrelation, matched residual energy distance computation, dynamic programming time alignment, event detection, and high-level postprocessing. Parameters which are used to measure the similarity between input utterances and stored templates are computed by the autocorrelation and residual energy algorithms. Dynamic programming time registration is used to determine the minimum distance between the word spoken and each stored reference pattern. Word recognition candidates are hypothesized by locating valley points in the minimum dynamic programming distance taken across all candidates. The recognition candidates are passed to high-level decision logic which applies a threshold comparison test and next-closest error threshold test to determine if the utterance is to be declared.

Feature Extraction

A variety of signal processing techniques exist for representing a speech signal in terms of time varying parameters which are useful for speech recognition. Examples of these signal processing transformations are the direct spectral measurement (mediated either by a bank of bandpass filters or by a discrete Fourier transform), the cepstrum, and a set of suitable parameters of a linear predictive model (LPC) (See J. D. Markel and A. H. Gray, Jr., "Linear Prediction of Speech", Springer-Verlag, New York, (1976)). Selection of the parameters depends to a considerable degree on implementation considerations. However, it is generally agreed that the linear predictive modeling techniques have performance comparable to or better than other techniques for speaker-dependent recognition tasks. Furthermore, an LPC-based recognition algorithm is attractive because of its compatibility with LPC-based speech analysis and synthesis techniques.

Similarity Measure

After feature extractions, the next basic recognition step is the computation of a similarity measure between a stored reference and the time-normalized parameters extracted from the utterance. The basic similarity measuring technique which is used may, for example, be patterned after that of F. Itakura, "Minimum Prediction Residual Principle Applied to Speech Recognition," IEEE Trans. Acoust., Speech, Signal Processing, ASSP-23, 67–72 (1975). In the Itakura approach, recognition is achieved by performing a frame-by-frame comparison of speech data using a normalized prediction residual. The LPC prediction residual energy is measured by passing the input speech signal (for the frame in question) through an all-zero inverse filter which represents the reference data. If the reference data matches the input data then the spectral notches in the inverse filter will match the spectral peaks in the input signal and a low-energy residual output will result. This residual energy is normalized by the residual energy which results when the inverse filter is optimally matched to the input data. The resulting normalized residual error is thus stabilized to be greater than 1. It typically takes on values of less than 1.2 for a good recognition match in speaker-dependent word recognition environments.

The prediction residual is computed easily as the inner product of the autocorrelation function of the input with the autocorrelation function of the impulse response of the inverse filter. Normalization by the residual of the input signal is not so simple. In essence the autocorrelation matrix must be inverted and the traditional method of choice is Levinson's algorithm (N. Levinson, "The Wiener RMS (Root Mean Square) Error Criterion in Filter Design and Prediction", J. Math. Phys. 25, 261–278 (1947)). An intermediate computation to a magnitude which is less than 1 was demonstrated by LeRoux and Gueguen, see J. LeRoux and C. Gueguen, "A Fixed Coefficient", IEEE Trans. Acoust., Speech, Signal Processing, ASSP-257–259 (1977).

Dynamic Programming

The measurement of similarity between the incoming speech and stored vocabulary representations requires compensation for changes in the length and timing of the input utterance. Thus, it is desirable to time warp the feature vectors obtained from the incoming data in some optimal sense prior to the comparison with stored feature vectors. The approach utilized may, for example, be a unique modification of the typical dynamic programming algorithm. In principle, the dynamic programming procedure is similar to that used by Itakura. Several modifications may be made to the basic Itakura approach, however. The Itakura approach assumes that the reference data is comprised of feature vector measurements obtained from frames of the speech signal which have the same length as the frames utilized during the recognition analysis procedure. The frame period of the input analysis is usually 10 to 20 msec in order to capture dynamic speech events. The basic difference between the Itakura approach and the modified Itakura approach is that reference data are represented only at every other input frame. This approach has several advantages. First, it halves the amount of reference data that must be stored. Second, it halves the number of dynamic programming computations that must be performed. Third, it simplifies the dynamic programming computation by eliminating the memory element required in the basic Itakura technique.

There are two other significant modifications which may be made to the Itakura time registration technique. First, and most significant, the endpoints are unconstrained. That is, there is no requirement that the dynamic optimization routine be constrained to start and end on specific input speech frames. This is a very significant simplification because it separates the high level word finding logic from the dynamic programming/recognition processing. Second, penalty errors are added, according to a nonlinear scale, when local warping occurs. Although a time warping factor of two may still be achieved, the algorithm prefers utterances with durations equal to the template duration.

Although processing time is substantially increased by not specifying the starting and ending input speech frames, there are two further reasons for having unconstrained endpoints. First, the system reliability is substantially improved by eliminating the requirement for endpoint determination. Accuracy requirements of 98% recognition or better would require the reliability of endpoint determination to be at least 98%. This is unrealistic, assuming that endpoint determination is based upon information that is not word specific. Second, the system is able to perform recognition of vocabulary words embedded in connected speech. By using the unconstrained endpoint dynamic programming algorithm, this system is able to perform recognition of vocabulary words which are not separated discretely in time. This is a distinct advantage over most other word recognition systems.

Decision Strategy

For each frame of input data, a sequence of scanning errors (similarity measures) are computed assuming that the current input frame corresponds to the last reference frame of each reference pattern. The best and next-best errors are stored along with the corresponding word indices. Before a word in the vocabulary can be hypothesized, a valley point in the scanning error minimum must be declared. The valley finding process is a key element in simplifying the decision strategy. A valley finding capability specially designed to satisfy word recognition applications is used. A local valley is defined as the minimum value in a subsequence of errors which begins and ends with values greater than or equal to this valley multiplied by a minimum peak-to-valley ratio. A word is recognized when five conditions are met:

1. A valley has been declared;
2. The dynamic programming scanning error (EVAL) is less than EMIN;
3. The next-best error is greater than EVAL±EDELT;
4. The prior hypothesis occurred at least TDELT time units ago where this time is related to the number of reference frames in the templates under consideration; and
5. The maximum energy during the utterance has exceeded EMAX; where EMIN, EDELT, TDELT, and EMAX are specified constants. All accumulated hypotheses are output when "silence" has occurred for a specified amount of time (typically 300 msecs). A frame is considered silent when the frame energy is less than a specified fraction (typically 0.1) of the maximum energy in the utterance.

Enrollment

The purpose of enrollment is to create a set of feature vectors for each vocabulary word which are utilized in the similarity measurement process during recognition. The enrollment strategy is to provide energy-based definition of start/stop time for an initial reference pattern for each vocabulary word, and then to update these reference patterns through a predetermined set of word sequences that admits connected multiple word utterances.

In the initial enrollment mode, one pass is made through the vocabulary and initial reference patterns are formed based upon energy endpoints of each utterance. The actual start and stop times include some padding (typically one frame) to allow conservative, and therefore more reliable, energy endpoint detections. For every reference frame, the speech autocorrelation coefficients are stored. These sets of coefficients determine the inverse filters. The reference patterns are represented in terms of the autocorrelation function of the inverse filter coefficients. Reference frames that have weak energy levels are weighted less than those with energies above a specified percentage of the maximum energy of a given reference template. This energy weighting is necessary to maintain high performance under noisy operating conditions.

After the initial templates are formed, additional passes through the vocabulary are collected from the user and are used to update the initial templates. The averaging algorithm uses the time registration information obtained from dynamic programming to determine which input coefficients are to be averaged with those stored as reference. For each prompt, the input utterance is compared with the reference data stored for that word. If the utterance is recognized (i.e., the scanning error is less than a threshold), then the template is updated by averaging the appropriate input speech autocorrelation coefficients with those stored as reference. If the utterance is not recognized (i.e., a poor match occurs), then the utterance is reprompted. The above process may be repeated as many times as is desired. More weight in the averaging process is assigned to those templates which have been updated multiple times. For example, during the Nth update the reference template is assigned a weight of N/N+1 while the input data is assigned a weight of 1/N+1. This achieves equal weighting of all input tokens.

Experiments indicate that a significant improvement in performance is achieved by successive updating of each reference template. Substitution rate decreases substantially as the number of training tokens increases. For example, when five training tokens are used to update the initial template, the corresponding substitution error rate decreases by a factor of three over that measured with one training pass. Improved connected speech recognition performance is achieved by prompting for connected speech and updating the isolated templates as described above.

As stated above, the preferred system is first initialized by having the user complete an enrollment procedure to record the name of each merchant in order to initially construct the user's customized list of merchant names. Later, when the user speaks a merchant name, the system compares the spoken name to the pre-recorded or stored library of merchant names previously spoken by the user and recorded by the system. In one embodiment of the present invention, the pre-recorded words are stored in two different formats. In one format, the word is digitized and stored in digital form. This format allows for easy conversion back to analog for subsequent playback. Additionally, the same word is converted by the voice recognition unit into a "signature" or "algorithm", which is a compact representation of the word. The "signature" includes certain properties of the word which are used later in the recognition or matching process.

The accuracy of the voice recognition function of the present invention is greatly improved through this use of "speaker dependent" voice recognition. In "speaker independent" voice recognition systems, voice recognition is used to compare the voice input of any of a number of different users to a common, generic voice template. Thus, for example, the word "Sears" is stored as a generic voice pattern to which the various ways in which "Sears" can be spoken by any number of different users is then compared. Due to different accents and geographic speech patterns, the voice pattern for the same word may be significantly different from one speaker to another. However, a "speaker independent" voice recognition system must be able to match this wide range of various spoken words to the same common, generic voice pattern for that particular word. If a word is spoken in a unique or sufficiently distinctive manner, proper voice recognition will not be accomplished.

In contrast, "speaker dependent" voice recognition pre-records for each user the particular word or words which are later to be recognized. Although this results in a greater memory requirement, in that the same word may be repeatedly stored, one pattern for each of the users, it nevertheless results in a greatly improved voice recognition system. The accuracy of the voice recognition system is improved because when a word is spoken by a user, the spoken word is compared to a voice pattern corresponding to the same word spoken by the same user. Accordingly, there will be less variation from the spoken word to the stored word. Such variations correspond to the minor variations resulting from the way the same user may differently pronounce the same word on different occasions. It is no longer necessary to take into account the difference in pronunciation for different users pronouncing the same word.

Figure 4:
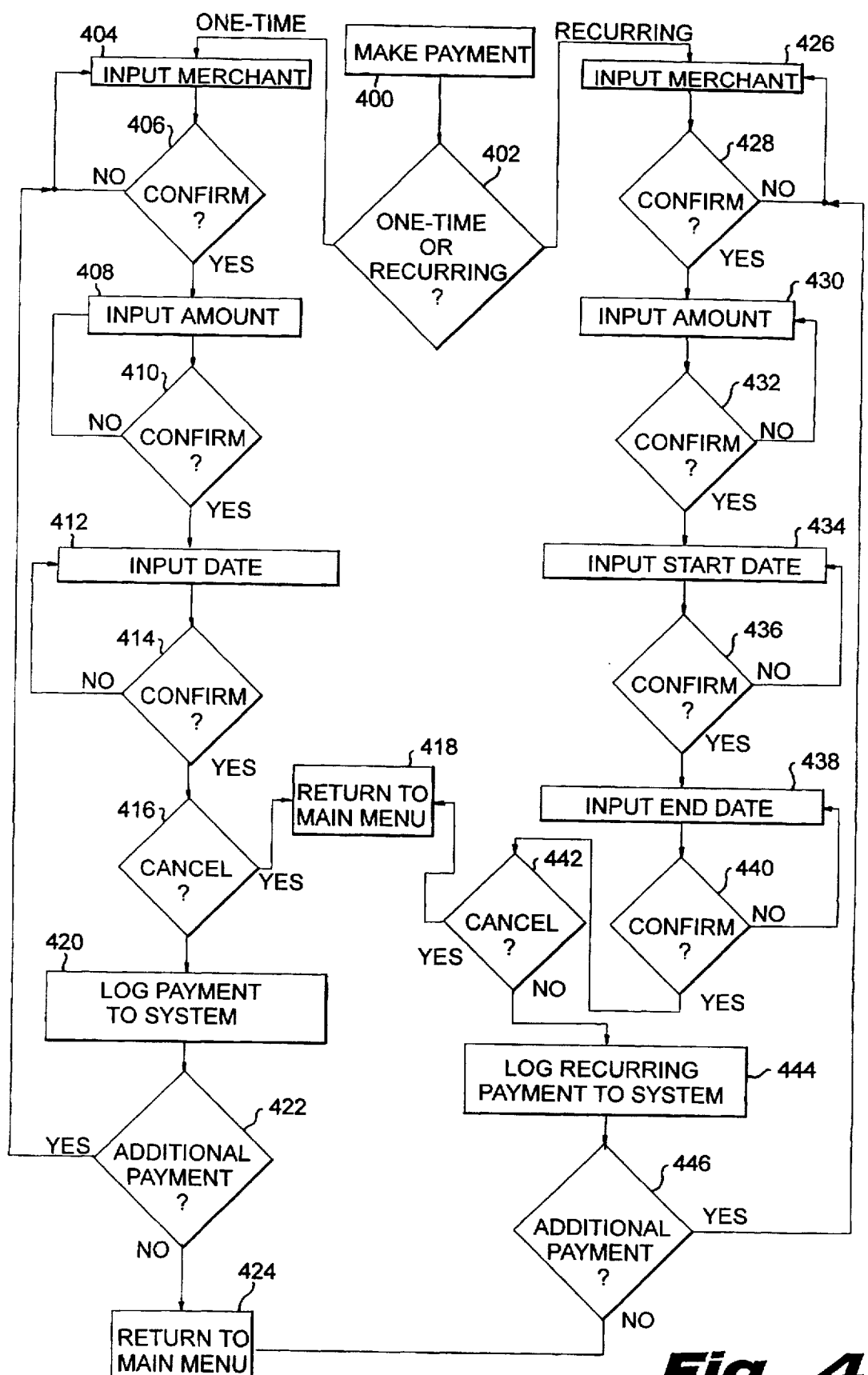
FIG. 4 is a flow chart illustrating the program sequence for making a payment according to the present invention.

Referring now to FIG. 4, therein is illustrated a flow chart of the presently preferred system operation corresponding to the procedure for making a payment. As shown in FIG. 4, the system proceeds to step 400 if a user has selected option "1" from the main menu of FIG. 1. System operation proceeds from step 400 to step 402 where the user is queried as to whether a "one-time" or "recurring" bill is to be paid. If the user at step 402 indicates that a "one-time" bill is to be paid, system operation proceeds to step 404 where the user is requested to select a particular merchant by speaking the merchant's name. The system receives the spoken merchant name at step 404 and, using the above-described "speaker dependent" voice recognition technology, compares the user's customized list of pre-recorded and stored merchant names in order to determine which merchant name has been selected by the user. The system then plays back the selected merchant name at step 406 and requests that the user confirm whether this is the merchant name selected by the user.

It should be noted that at step 406, the merchant name which is played back to the user is played back in the user's own voice. If at step 406 the user indicates that the merchant is incorrect, system operation loops back to step 404 and the user is again requested to input the merchant name. If instead at step 406 the user confirms that the played back merchant name is correct, system operation proceeds to step 408 where the user is requested to input the amount of the bill to be paid to the specified merchant. The user may input the amount at step 408 by simply speaking the amount, in which case the system would utilize voice recognition technology to determine the amount of the bill to be paid. However, an alternative and simpler approach is to have the user input the amount of the bill at step 408 using the numeric touch-tone keypad found on the telephone. This latter approach does not greatly complicate the system from a user point of view; however, it greatly simplifies the voice recognition functionality required for spoken bill amounts.

The bill amount is played back to the user at step 410 and the user is requested to confirm whether the bill amount is correct. If at step 410 the user indicates that the bill amount is incorrect, system operation loops back to step 408 and the user is again requested to input the bill amount.

Alternatively, if at step 410 the user confirms that the bill amount is correct, system operation proceeds to step 412 where the user is requested to input the date on which the bill is to be paid. The user input at step 412 is similar to the user input at step 408, in that it may be accomplished either using spoken words interpreted by voice recognition technology, or alternatively, requiring the user to enter the date using the numeric touch-tone keypad of the telephone. The date entered by the user at step 412 is played back at step 414 and the user is requested to confirm whether the date is correct. If the date played back at step 414 is not correct, the system loops back to step 412 and requests the user to input the date again.

Alternatively, if at step 414 the user indicates that the date is correct, system operation proceeds to step 416 where the user is queried as to whether the selected bill payment transaction just completed by the user is to be cancelled. This gives the user the option of cancelling the bill scheduled to be paid should the user decide not to pay the bill at that point. If at step 416 the user indicates that the specified bill is not to be paid, the system proceeds to step 418 and returns to the main menu of FIG. 1. It should be noted that if at step 416 the user indicates that the bill payment is to be cancelled, the bill payment information entered from steps 404 through step 414 is not stored in the system and is simply ignored.

Alternatively, if at step 416 the user indicates that the bill payment transaction is not to be cancelled, i.e., that the user wishes to proceed with the bill payment transaction, system operation proceeds to step 420 where the information input by the user from steps 404 through 414 is logged into the system and the bill is scheduled for payment on the date indicated by the user, in the amount indicated by the user. From step 420, the system proceeds to step 422 where the user is queried as to whether additional payments are to be scheduled at this time. If at step 422 the user indicates that additional payments are to be scheduled, system operation loops back to step 404 and the process is repeated. Alternatively, if at step 422 the user indicates that no additional payments are to be scheduled, system operation proceeds to step 424 where the system returns to the main menu of FIG. 1.

Referring again to FIG. 4, if at step 402 the user indicates that a recurring bill is to be scheduled for payment, the system proceeds from step 402 to step 426 where the user is instructed to input a merchant name. The system receives the merchant name input at step 426 and, using voice recognition technology, determines which name the user has selected from among the user's customized list of merchant names pre-stored and pre-recorded within the system. The selected merchant name is played back for the user at step 428 and the user is queried in order to confirm that the selected name is the one desired by the user. If at step 428 the user does not confirm that the played back name is the desired name, the system loops back to step 426 and the user is again requested to input the merchant name. If instead at step 428 the user does confirm that the played back name is the desired merchant name, the system proceeds to step 430 where the user is requested to input the amount to be paid. The user input at step 430 is similar to the user input at step 408 discussed above.

As stated above, the user input at this point may be in the form of spoken words which are interpreted using voice recognition technology or, alternatively, may be entered using the numeric touch-tone keypad of the telephone. The input amount of the bill is played back to the user at step 432 in order to confirm that the bill amount is correct. If at step 432 the user indicates that the bill amount is not correct, the system loops back to step 430 and the user is again requested to input the bill amount. Alternatively, if at step 432 the user confirms that the bill amount is correct, system operation proceeds to step 434 where the user is requested to input the starting date for payment of the first bill to be paid. The user input at step 434 may also be in the form of either spoken words interpreted using voice recognition technology, or date information using the numeric touch-tone keypad of the telephone. The input start date specified by the user at step 434 is played back to the user at step 436 where the user is requested to confirm whether the input start date played back is correct. If the user indicates that the input start date is not correct, the system goes back to step 434 where the user is again requested to input the start date. Alternatively, if at step 436 the user indicates that the input start date is correct, system operation proceeds to step 438 where the user is instructed to input the end date of the recurring series of bills which is to be paid. Again, the user input at step 438 is similar to the user input at step 434.

Proceeding, the user is queried at step 440 in order to confirm whether the input end date is correct. If the user indicates at step 440 that the input end date is not correct, the system goes back to step 438 where the user is again instructed to input the end date. Alternatively, if the user confirms at step 440 that the input end date is correct, the system proceeds to step 442 where the user is queried as to whether the specified series of recurring bills scheduled for payment should be cancelled or not. If the user indicates at step 442 that the recurring bill transactions are to be cancelled, the system proceeds to step 418 and returns to the main menu of FIG. 1. Alternatively, if the user indicates at step 442 that the recurring bill payment transactions are not to be cancelled, i.e., that payment is to proceed, the system operation goes to step 444 and logs the recurring payment information entered from steps 426 through 438 into the system. From step 444, the system proceeds to step 446 where the user is queried as to whether additional payments are to be scheduled at this time. If the user indicates at step 446 that additional payments are to be scheduled, the system operation loops back to step 426 and the process is again repeated. Alternatively, if at step 446 the user indicates that no additional payments are to be scheduled at this time, then system operation proceeds to step 424 and returns to the main menu of FIG. 1.

As stated above, in the system of FIG. 4, when a user has finished processing one payment, either a "one-time" or "recurring" payment, the user is queried as to whether additional payments are to be made. If the user indicates that additional payments are to be made, steps 422 and 446 of FIG. 4, the system loops back to allow the user to continue payments of the same type, i.e., if the user was just inputting a "one-time" payment, the system will loop back and allow the user to input another "one-time" payment. Similarly, if the user has just inputted a "recurring" payment, the system loops back and allows the user to enter another "recurring" payment. In an alternative embodiment, the system loops back from steps 422 and 446 back to step 402. At step 402 the user is presented with the option of either "one-time" or "recurring" bill payment. In this latter embodiment, the user can go back and forth between scheduling "one-time" or "recurring" bill payment transactions.

Figure 5:
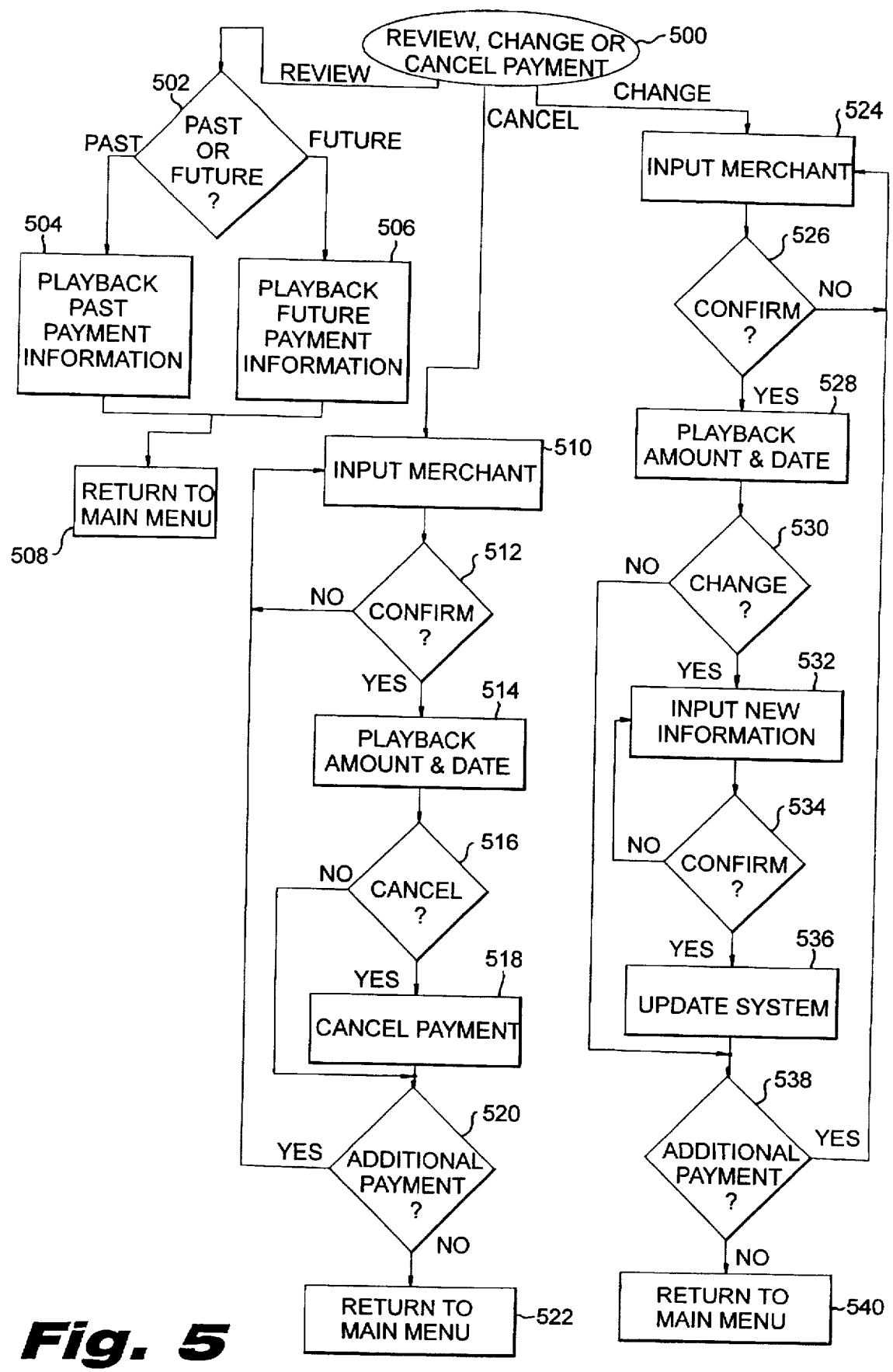
FIG. 5 is a flow chart illustrating the program sequence for reviewing, changing or cancelling payments according to the present invention.

When the user selects option "2" from the main menu of FIG. 1, i.e., reviewing, changing or cancelling a payment, the system operation in this instance is set forth in FIG. 5. As shown in FIG. 5, the system is at step 500 when the user requests to review, change or cancel a payment. At step 500 the user is queried as to whether a "review", "change" or "cancel" function is to be implemented. The user may speak one of these selections at this point, and the system, utilizing voice recognition technology, will determine which function has been selected by the user. If the user selects the "review" option, system operation proceeds to step 502 where the user is queried as to whether "past" or "future" payments are to be reviewed. If at step 502 the user indicates that "past" payments are to be reviewed, the system proceeds to step 504 and plays back past payment information. The information played back at step 504 may consist of the last payment scheduled, the last two payments scheduled . . . last "n" payments scheduled, the particular number of payments "n" played back at step 504 being an adjustable system parameter depending upon the particular requirements of the system in place.

Going back to step 502, if the user indicates that a "future" payment is to be reviewed, the system proceeds to step 506 and plays back to the user the future payments scheduled by the user. The future payments played back at step 506 may similarly consist of the next payment, the next two payments . . . the next "n" payments, with the number of payments "n" played back at step 506 also being an adjustable parameter being set by the particular system in use. Once the playback of the payment information is completed at either step 504 of 506, system operation proceeds to step 508 and returns to the main menu of FIG. 1.

When at step 500 of FIG. 5, the user selects the "cancel" option, system operation proceeds to step 510 where the user is instructed to speak the merchant name of the bill which is to be cancelled. The system receives the merchant name spoken by the user at step 510, and using voice recognition technology, selects which merchant name from among the user's customized list of pre-stored and recorded merchant names has been selected by the user. The selected merchant name is played back to the user at step 512, in the user's own voice, and the user is queried in order to confirm whether this is in fact the selected merchant name. If the user indicates at step 512 that the selected name is incorrect, the system operation goes back to step 510 where the user is again requested to enter the merchant name. Alternatively, if at step 512 the user confirms that the selected merchant name is correct, the system proceeds to step 514 and plays back the pre-stored amount and date associated with the selected merchant. The system then proceeds to step 516 and queries the user as to whether the selected merchant and bill transaction is to be cancelled. If the user indicates at step 516 that the particular bill transaction is to be cancelled, the system proceeds to step 518 and cancels the scheduled payment for that bill transaction. The system then proceeds from step 518 to step 520 and queries the user as to whether additional payments are to be cancelled. Going back, if at step 516 the user had indicated that the selected merchant and bill transaction was in fact not to be cancelled, then system operation proceeds directly from step 516 to step 520, completely bypassing the cancel operation at step 518.

At step 520, if the user indicates that additional payments are to be cancelled, system operation loops back to step 510 and the process is repeated again. Alternatively, if at step 520 the user indicates that no additional payments are to be cancelled, the system proceeds to step 522 and returns to the main menu of FIG. 1.

If at step 500 of FIG. 5 the user indicates that a "change" operation is to be carried out, the system proceeds to step 524 and requests the user to speak the merchant name associated with the bill transaction which is to be changed or modified. The system receives the spoken merchant name at step 524 and, using voice recognition technology, compares the spoken name at step 524 with the user's pre-recorded and pre-stored customized list of merchant names. The merchant name from among the user's customized list which matches the spoken merchant name at step 524 is determined to be the selected merchant name. This merchant name is played back to the user at step 526 and confirmation is requested from the user as to whether this is in fact the selected merchant name. If at step 526 the user indicates that the merchant name is not correct, the system goes back to step 524 and again prompts the user to input the merchant name once again. Alternatively, if at step 526 the user indicates that the merchant name is correct, the system proceeds to step 528 and plays back the amount and date associated with the bill transaction for the selected merchant name.

The system then proceeds to step 530 where the user is queried as to whether it is desired to change the bill transaction information for the selected merchant. If at step 530 the user indicates that the bill transaction information is to be changed, the system proceeds to step 532 and receives the new information from the user. The information input at step 532 is similar to the information input in the flow chart illustrated in FIG. 4, i.e., merchant name, bill payment date and bill payment amount. This information is played back to the user at step 534 and confirmation is requested from the user as to whether the information is correct. If at step 534 the user indicates that the information is not correct, the system goes back to step 532 and again prompts the user to input the new bill transaction information. Alternatively, if at step 534 the user indicates that the information is correct, the system proceeds from step 534 to step 536 and updates the internal records of the system to reflect the newly entered information at step 532. The system then proceeds to step 538 where the user is queried as to whether the information for additional payments is to be changed at this time. Referring back to step 530, if at step 530 the user had indicated that the bill information associated with this merchant was not to be changed, then the system proceeds from step 530 directly to step 538, bypassing steps 532–536 where the information is received from the user and updated within the system. At step 538, if the user indicates that the information associated with additional payments is to be changed, the system loops back to step 524 and repeats the process again. Alternatively, if the user indicates at step 538 that no additional payment information is to be changed, the system proceeds to step 540 and returns to the main menu of FIG. 1.

The system operation described and illustrated in FIGS. 3A, 3B, 4 and 5 jumps to certain points depending on the user's response to the various queries. However, the situation may arise where the system in caught in a seemingly endless loop. Referring to FIG. 3A, if the user always indicates "NO" at "CONFIRM" step 326, the system will always loop back to step 322, eventually returning to step 326 again. In order to avoid this type of "infinite" loop, the present system includes one or more safety mechanisms, such as an absolute time time-out or a response limited time-out. An absolute time time-out mechanism will exit the particular loop and return the user to the main menu after a predetermined time period, e.g., 30 seconds, has elapsed if the user is still stuck within the same loop. Similarly, a response limit time-out will return the user to the main menu after a predetermined number of the same responses, e.g., five, are made within the same loop.

The system of the present invention may be located at a financial institution, which in turn is connected to a bill payment system, such as the Visa Interactive Bill Payment System. In this configuration, users access the voice recognition system located at the financial institution. In an alternative configuration, the voice recognition system of the present invention is centrally located as part of the bill payment system, i.e., as part of the Visa Interactive system. In this latter configuration, the voice recognition system of the present invention is essentially a shared resource among several financial institutions. Users who access the financial institution to perform bill paying are transparently routed to the voice recognition system located at the Visa Interactive site. In this way, each individual financial institution does not have to expend the required hardware and development costs associated with the voice recognition system.

In the centrally located configuration described above, the bill payment system of the present invention may provide different levels of voice recognition depending on the particular requirements of each financial institution. For example, some financial institutions may offer speaker dependent voice recognition, speaker independent voice recognition, or no voice recognition at all. The present system is universally flexible in that the appropriate resources may be activated to provide the desired level of service. This may be achieved using presently available ANI (automatic number identification), DNIS (dialer number identification service), or other call identification technology. When an incoming call to the system is received, the calling number of the user is obtained and the user's financial institution is determined using any of a number of look-up procedures. Based on the user's financial institution, the appropriate level of service is provided to the user.

While the invention has been particularly shown and described with reference to a preferred embodiment thereof, it will be understood by those skilled in the art that various changes in form and details may be made therein without departing from the spirit and scope of the invention.

We claim:

1. A bill payment system for allowing a user to select a particular bill to be paid, said system comprising:

a user interface for receiving user inputs including voice patterns from said user and providing bill payment information to said user;

a voice recording circuit for storing voice patterns previously input by said user in a manner suitable for playback;

a voice recognition circuit for performing voice recognition on said user's previously stored voice patterns and current voice patterns input by said user;

a selection circuit which receives current voice patterns from said user interface and using said voice recognition circuit selects said previously stored voice pattern matching said current voice pattern; and a playback circuit for playing back to said user bill payment information including said selected previously stored voice pattern to thereby provide audible confirmation of said user's selections, playback of said user's previously stored voice pattern being in the user's voice.

2. A bill payment system according to claim 1, wherein said previously stored voice pattern includes a merchant's name.

3. A bill payment method for allowing a user to select a particular bill to be paid, said method comprising the following steps:

receiving user input including voice patterns from a user;

providing bill payment information to said user;

using a voice recording circuit to store voice patterns previously input by said user in a manner suitable for playback;

using a voice recognition circuit to perform voice recognition on said user's previously stored voice patterns and current voice patterns input by said user;

using a selection circuit to receive current voice patterns from said user and using said voice recognition circuit to select said previously stored voice pattern matching said current voice pattern; and using a playback circuit to play back to said user bill payment information including said selected previously stored voice pattern to thereby provide audible confirmation of said user's selections, playback of said user's previously stored voice pattern being in the user's voice.

4. A bill payment method according to claim 3, wherein said previously stored voice pattern includes a merchant's name.

* * * * *